United States Patent [19]

Schlotz

[11] 3,979,095
[45] Sept. 7, 1976

[54] SUSPENSION CLAMP FOR ELECTRICAL OVERHEAD LINES

[75] Inventor: Heinz, Schlotz Esslingen-Hegensberg, Germany

[73] Assignee: Patentanwalte Dr.-Ing. Held, Stuttgart, Germany

[22] Filed: Feb. 18, 1975

[21] Appl. No.: 550,650

[52] U.S. Cl. ............................................. 248/63
[51] Int. Cl.² ......................................... H02G 7/04
[58] Field of Search ............. 248/63, 64; 174/40 R, 174/42, 43

[56] References Cited
UNITED STATES PATENTS

| | | | |
|---|---|---|---|
| 1,722,118 | 7/1929 | Varney | 248/63 |
| 1,793,505 | 2/1931 | Miller | 248/64 |
| 1,842,809 | 1/1932 | Varney | 248/63 |
| 2,005,882 | 6/1935 | Arnold | 248/63 |
| 2,081,974 | 6/1937 | Arnold | 248/63 X |
| 3,005,866 | 10/1961 | Fraser et al. | 248/64 |
| 3,544,702 | 12/1970 | Philipps | 248/63 X |
| 3,784,137 | 1/1974 | Eddens et al. | 248/63 |

FOREIGN PATENTS OR APPLICATIONS

| | | | |
|---|---|---|---|
| 687,893 | 8/1930 | France | 248/63 |
| 357,878 | 10/1931 | United Kingdom | 248/63 |
| 350,187 | 6/1931 | United Kingdom | 248/63 |

*Primary Examiner*—Roy D. Frazier
*Assistant Examiner*—Rodney H. Bonck
*Attorney, Agent, or Firm*—Eugene J. Kalil; Francis J. Murphy

[57] ABSTRACT

A suspension clamp for an overhead electrical cable includes a clamping member which clamps the cable along a portion of its longitudinal sides. Arms extend outwardly from the opposed lateral sides of the clamping member along the direction defined by the cable. Supporting members for the cable are mounted on each of these arms at a distance from the clamping member such that the cable will be free to oscillate within the space between the clamping member and each of the supporting members.

5 Claims, 4 Drawing Figures

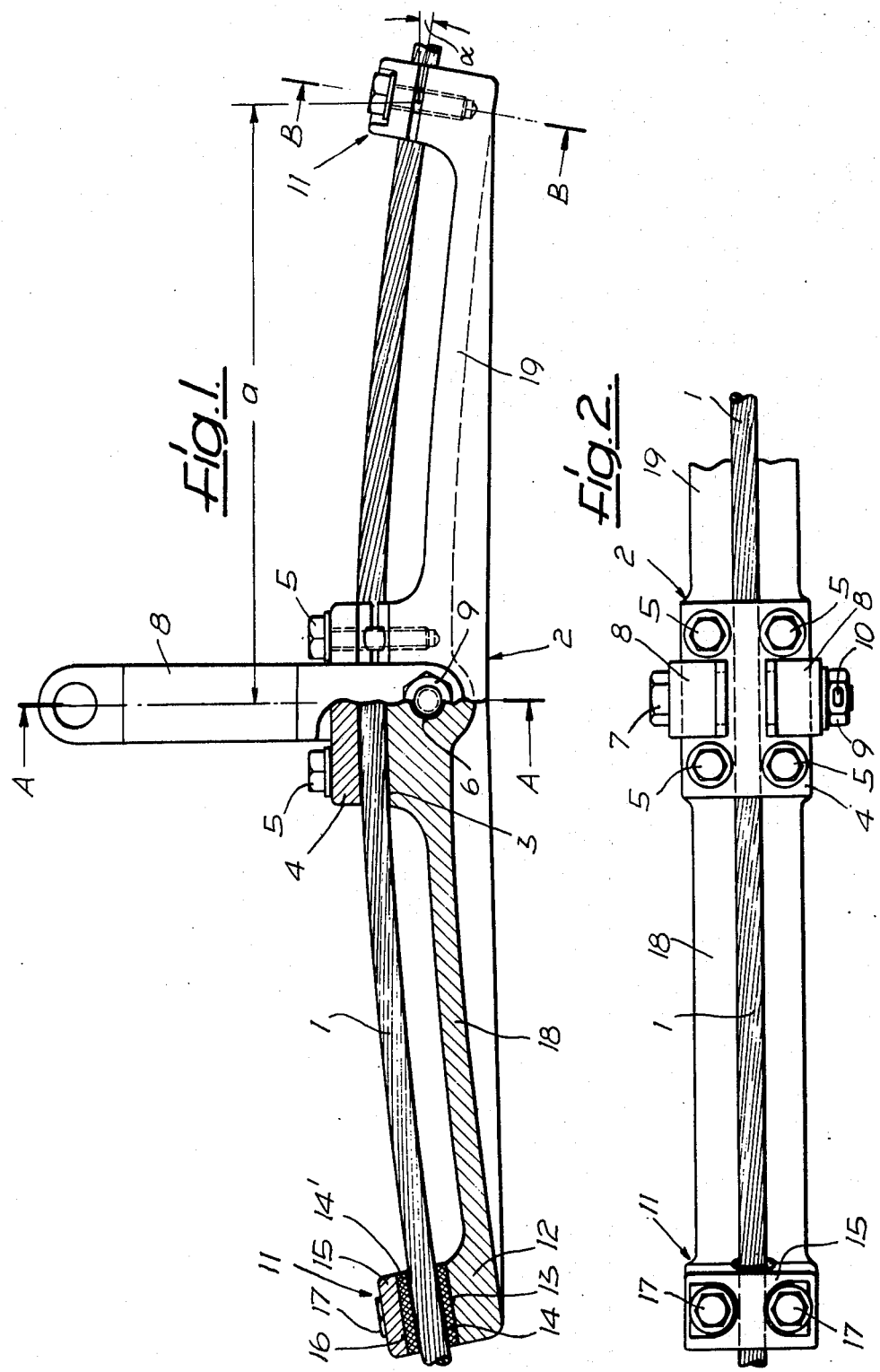

SUSPENSION CLAMP FOR ELECTRICAL OVERHEAD LINES

BACKGROUND OF THE INVENTION

This invention relates to a suspension clamp for electric overhead cables having multiple support points for the inserted overhead cable and a cable through which may be suspended by a hinged joint from an insulator chain.

In the design of suspension clamps, care must be taken to keep the stressing of the overhead cable as low as possible. More especially, the alternating bending stresses which are caused by oscillations of the conductors of the overhead cable between adjacent suspension clamps must be kept as low as possible, because these stresses reduce the life of the overhead cable. The magnitude of such alternating bending stresses depend upon the construction of the suspension clamp. By providing a hinged suspension for the cable through, it is possible to reduce the alternating bending stresses at the outlet points of the cable trough by almost one half as compared with the alternating stresses generated when a rigidly suspended cable trough is utilized.

In order to further reduce the alternating bending stresses on the cable, suspension clamps have been developed which support the overhead cable at two or more longitudinally spaced points. In prior art clamps of this type, the supporting devices are linked together by levers, in order to obtain as far as possible uniform pressure at all supporting points, but the cost of constructing such a suspension clamp is high and the parts of such a clamp are movable relative to each other causing considerable wear. Owing to the distances between the individual supporting devices, which distances are often quite large, the moment of inertia of such a suspension clamp becomes very large, which is undesirable in view of the resulting oscillation properties.

It has also been proposed that the suspended overhead cable be reinforced in the area of its suspension points by prefabricated wire coils. These wire coils may be placed resiliently around the cable to provide an elastic support for the cable but the suspension clamp must then be provided with a cable channel which is considerably larger in diameter than would be necessary for directly gripping the cable. Because of this such a clamp becomes large, heavy and expensive.

The present invention provides a suspension clamp which keeps the alternating bending stresses of the overhead line low but is nevertheless of simple construction and wear-resistant.

SUMMARY OF THE INVENTION

A suspension clamp for an electrical cable includes clamping means to clamp the cable along a portion of its longitudinal surface; means to support this clamping means so that it is free to move about an axis which is transverse to the longitudinal axis of the cable; two arms extending respectively outwardly from opposite sides of the clamping means substantially in the direction of the cable; and support devices mounted respectively on each of these arms at a point which is spaced a distance from the clamping means, such that the cable is free to oscillate between the clamping means and each of the support devices. Advantageously the distance between the clamping means and each of the support devices is chosen so that it is approximately equal to the pitch of the cable.

DESCRIPTION OF THE DRAWINGS

The invention will now be described in detail with reference to an embodiment shown by way of example in the affixed drawings, in which FIG. 1 shows an elevational view of the suspension clamp in which one portion of the clamp is shown in longitudinal section;

FIG. 2 shows a partial upper plan view of the suspension clamp;

DESCRIPTION OF THE INVENTION

Figure 3:
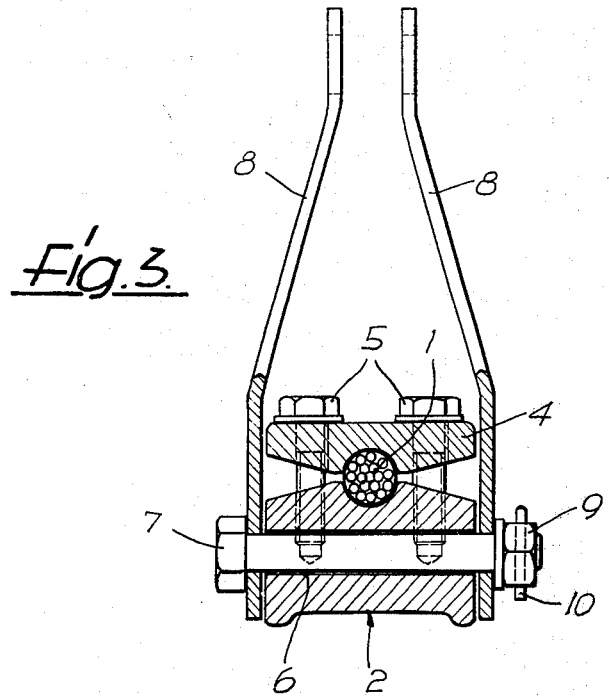
FIG. 3 is a sectional view taken along plane A-A of FIG. 1.

A suspension clamp for an overhead cable 1 includes a cable trough 2 having a cable channel 3 in which the overhead cable 1 to be suspended is placed. A metal pressure member 4, and screws 5 are used to clamp the overhead cable 1 over a relatively short portion of its longitudinal surface within the cable trough 2, in a mechanically solid and electrically conducting manner to provide a clamping point which is the central one of three cable support points of the suspension clamp.

The cable trough 2 has a transverse aperture 6 located below and extending at right angles to the cable channel 3. A bolt 7 extends through aperture 6 in the trough and through corresponding apertures formed in the suspension straps 8 to create a hinged joint between the cable trough 2 and the two suspension straps 8. In the embodiment shown, the two suspension straps 8 are arranged respectively on the two opposed longitudinal sides of the cable trough 2 and are secured against movement in the axial direction along the bolt 7 by means of a nut 9 and a cotter pin 10. The suspension straps 8 can be connected to an insulator chain at their upper end in a manner known in the art. In this way the cable trough 2 is suspended below the insulator chain by means of the suspension straps 8 and the bolt 7, so that the cable trough is movable about an axis through bolt 7. The swivel axis through bolt 7 is located below the cable clamping point.

The cable trough 2 further includes arms 18 and 19, extending outwardly from opposed lateral sides of the clamp below and substantially along the suspended cable. The two arms 18 and 19 are preferably integral with the cable trough 2 and include at their outer ends, at a distance (a) from the cable trough, supporting elements 11 which provide additional support points for the overhead cable 1. The distance (a) must, on the one hand, be large enough to permit the overhead cable 1 to oscillate between the clamping point at the pressure member 4 and each of the supporting devices 11, but should, on the other hand, not be so large that the moment of inertia of the suspension clamp about the swivel axis through the bolt 7 becomes excessive. It is desirable that the distance (a) be about equal to the pitch of the overhead cable 1 when the cable pitch is defined as the distance measured in the longitudinal direction of the cable which would be required by the individual spiral-shaped cable conductor to make a full turn about the longitudinal axis of the cable.

The body of the suspension clamp consisting of the cable trough 2 and the extensions 18 and 19 should be both light and as stiff as possible for its weight. In the embodiment shown in the drawings, the arms 18 and 19 of the suspension clamp have a u-shaped indentation extending into their undersides resulting in low weight for the clamp combined with the desired stiffness. The upper surface of the arms 18 and 19 curve downwardly from the clamping member in the longitudinal direction of the cable, to approximately the same extent as the overhead cable 1 is curved downwardly by gravity. The U-shaped cavity formed by the indentation in the underside of the clamp extends from points adjacent to support devices 11 on arms 18 and 19 through and beneath the cable trough 2. The clamp including arms 18 and 19, has a rectilinear lower edge, so that the depth of the cavity decreases to zero beneath the supporting devices 11 and increases to a point adjacent to the cable trough.

Figure 4:
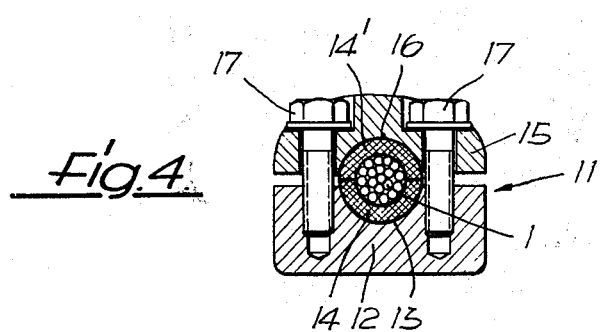
FIG. 4 is a sectional view taken along plane B-B of FIG. 1.

The two supporting devices 11, which are of identical shape, each include a base number 12 which is made integrally with the respective arms 18 and 19 and has no approximately rectangular upper face. The bases 12 of each of the supporting devices 11 includes a groove 13 of approximately semicircular cross-section in its upper face as best seen in FIG. 4 which groove extends in the longitudinal direction of the cable. In the groove 13 a half shell 14 of resilient material, such as rubber may be embedded. The internal radius of the shell 14 corresponds to the outer radius of the overhead cable 1. A cover 15 is provided having a substantially semicircular groove 16, corresponding to the groove 13, for accommodating a half shell 14', which has the same form as the half shell 14 and is of a similar elastic material. The cover 15 is held against the base 12 by means of the screws 17, causing the grooves 13 and 16 to form a cable channel and the two half shells 14 and 14' of resilient material to grip the overhead cable and support it elastically between the base 12 and the cover 15 of each support member 11. The thickness of the half shells 14 and 14' is chosen so that even the largest oscillatory of the overhead cable 1 can be absorbed in a fully elastic manner. The arms 18 and 19 are arranged far enough below the cable to ensure that oscillations of the overhead cable will not cause the cable to hit the extensions.

The half shells 14 and 14' will also prevent metallic contact between the overhead cable and the bases 12 and covers 15 of the supporting members 11 and thereby prevent frictional wear which could be the starting point of a cable breakage. For this reason, it is also advisable to provide a non-metallic insert within cable channel 3 about these areas where the overhead cable 1 enters and leaves the cable channel 3. These inserts can be similar in configuration and function to half shells 14 and 14' and may be made of a similar resilient material such as rubber. These inserts extend between the inner surface of the cable trough 2 and the pressure member 4, on the one hand, and exterior surface of the overhead cable in the areas adjacent to the ends of channel 3. Even with such inserts the remaining contact area between the overhead cable 1 and the cable trough 2 and pressure member 4 is sufficient to provide the electrically conducting connection which is made in a suspension clamp of this kind.

The angle of deflection of the cable 1, as it emerges from supporting members 11, is the angle formed between the longitudinal axis of the overhead cable and the horizontal, and this angle will vary depending upon prevailing topographic conditions in the area of use. To eliminate the need to make different suspension clamps for the different angles of deflection, encountered in different areas of use, the supporting devices 11 can be adjusted to an average value of the angles of deflection, normally encountered, which angle is about 5°. Experience has shown that deviations from this 5° angle of deflection can be taken up by the resilient shells 14 and 14', without impairing their functional capacity.

As the overhead cable oscillates the elastic support provided by shells 14 and 14' within the supporting devices 11 results in an oscillation node being formed in each of the supporting devices 11 so that the overhead cable will oscillate freely within the space between each of the supporting devices 11 and the clamping point at the cable trough 2. In this manner, alternating bending stresses on the cable 1 are reduced considerably.

Because of oscillations of the overhead cable, the distance between the supporting devices 11 and the clamping point in the cable trough 2 is preferably made about equal to the pitch of the cable 1, as described above. It can, however, also be a longer or shorter distance provided that the moment of inertia of the suspension clamp about the axis through the bolt 7 does not become excessively large.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. A suspension clamp for an electrical cable having a characteristic pitch including
   clamping apparatus to clamp said cable along a portion of its longitudinal side;
   means to support said clamping apparatus so that said clamping apparatus is free to move about an axis transverse to said cable;
   two arms integral with and extending outwardly respectively from opposed sides of said clamping apparatus along but spaced from said cable; and
   supporting devices for said cable, one of said supporting devices being mounted on each of said arms at a predetermined distance from said clamping apparatus said predetermined distance being approximately equal to said characteristic pitch.
2. A suspension clamp as claimed in claim 1 in which each of said supporting devices includes a base member formed integrally with one of said arms, said base member having a first groove of approximately hemispherical cross section formed in its upper surface and a first elongated shell of a resilient material disposed in said first groove; a cover member having a groove of approximately hemispherical cross section formed in its lower surface and a second elongated shell of a resilient material disposed in said second groove; and means to attach said cover member to said base member so that said grooves are aligned to form a channel for said cable and said elongated shells are arranged to surround and be contiguous with a portion of the longitudinal side of said cable.
3. A suspension clamp as claimed in claim 2 in which the axis of the clamping channels of said supporting devices form an angle of approximately 5° beneath the horizontal plane.

4. A suspension clamp as claimed in claim 1 in which each of said arms includes a substantially U-shaped indentation extending into the lower surface of said arm and the upper surface of each of said arms slopes downwardly from said clamping apparatus to said support device.

5. A suspension clamp as claimed in claim 1 in which said clamping apparatus includes a first elongated member having a first centrally disposed longitudinal groove;

a second elongated member having a second centrally disposed longitudinal groove;

means to join said first and second elongated members so that said grooves define a channel having an entry and exit orifice which channel is adapted to surround and clamp said cable along a portion of its longitudinal surface; and a lining of non-metallic material disposed over at least a portion of the inner surface of said channel adjacent to said entry and said exist orifices.

* * * * *

UNITED STATES PATENT OFFICE
CERTIFICATE OF CORRECTION

Patent No. 3,979,095     Dated September 7, 1976

Inventor(s) SCHLOTZ, Heinz

It is certified that error appears in the above-identified patent and that said Letters Patent are hereby corrected as shown below:

Column 6, Line 10, delete "exist" and insert -- exit --.

Signed and Sealed this

Twenty-first Day of December 1976

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,979,095      Dated September 7, 1976

Inventor(s) Schlotz, Heinz

It is certified that error appears in the above-identified patent and that said Letters Patent are hereby corrected as shown below:

Title Page, in the caption, change the Assignee from "Patentanwalte Dr.-Ing. Held" to -- Firma Karl Pfisterer Signed and Sealed this Tenth Day of May 1977

[SEAL]

*Attest:*

RUTH C. MASON
*Attesting Officer*

C. MARSHALL DANN
*Commissioner of Patents and Trademarks*